United States Patent [19]

Lapp et al.

[11] 4,187,327
[45] Feb. 5, 1980

[54] METHOD OF PROCESSING AN ELECTRICAL APPARATUS

[75] Inventors: John Lapp, Franklin, Wis.; John R. Willy, Greenwood, S.C.

[73] Assignee: McGraw-Edison Company, Elgin, Ill.

[21] Appl. No.: 801,637

[22] Filed: May 31, 1977

Related U.S. Application Data

[63] Continuation of Ser. No. 612,028, Sep. 10, 1975, abandoned.

[51] Int. Cl.² .................. H01G 13/04; B05D 5/12
[52] U.S. Cl. ........................ 427/8; 55/41; 55/43; 29/25.42; 427/79; 427/81; 427/294; 427/345
[58] Field of Search .......... 29/25.42; 427/79, 81, 427/58, 8, 294, 345; 55/41, 43

[56] References Cited

U.S. PATENT DOCUMENTS

| | | | |
|---|---|---|---|
| 2,951,002 | 8/1960 | Ruscito | 361/314 |
| 2,967,788 | 1/1961 | Mathers | 427/81 |
| 3,258,666 | 6/1966 | Dubilier | 29/25.42 |
| 3,335,343 | 8/1967 | Moore et al. | 29/25.42 |
| 3,530,561 | 9/1970 | Cox | 29/25.42 |
| 3,737,961 | 6/1973 | Lapp et al. | 29/25.42 |
| 3,831,234 | 8/1974 | Lapp et al. | 29/25.42 |

FOREIGN PATENT DOCUMENTS

880920 10/1961 United Kingdom .................. 55/43

*Primary Examiner*—John D. Smith
*Attorney, Agent, or Firm*—Andrus, Sceales, Starke & Sawall

[57] ABSTRACT

A method of processing an electrical apparatus, such as a capacitor, containing a polymeric dielectric material. The interior of the capacitor casing, which is at room temperature, is initially connected to a vacuum source to evacuate the interior of the casing and when a vacuum sensing unit indicates that the required vacuum has been obtained, a degassed dielectric liquid is supplied to the interior of the casing. A positive pressure is applied to the liquid in the casing to fully impregnate the polymeric layer. When the desired capacitance is obtained, the impregnation is complete and the unit is sealed.

3 Claims, 2 Drawing Figures

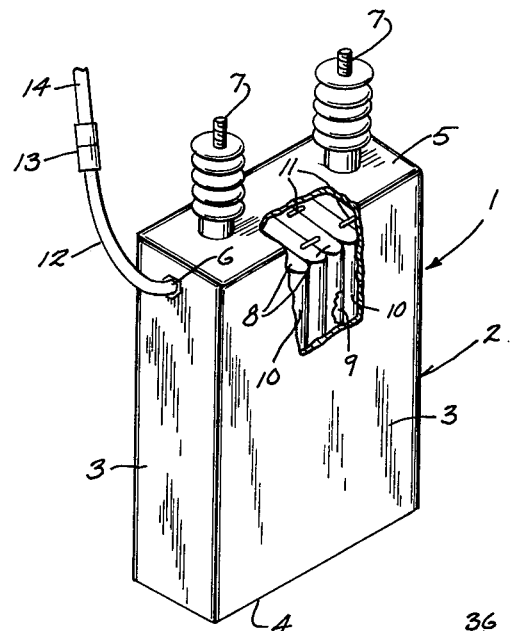
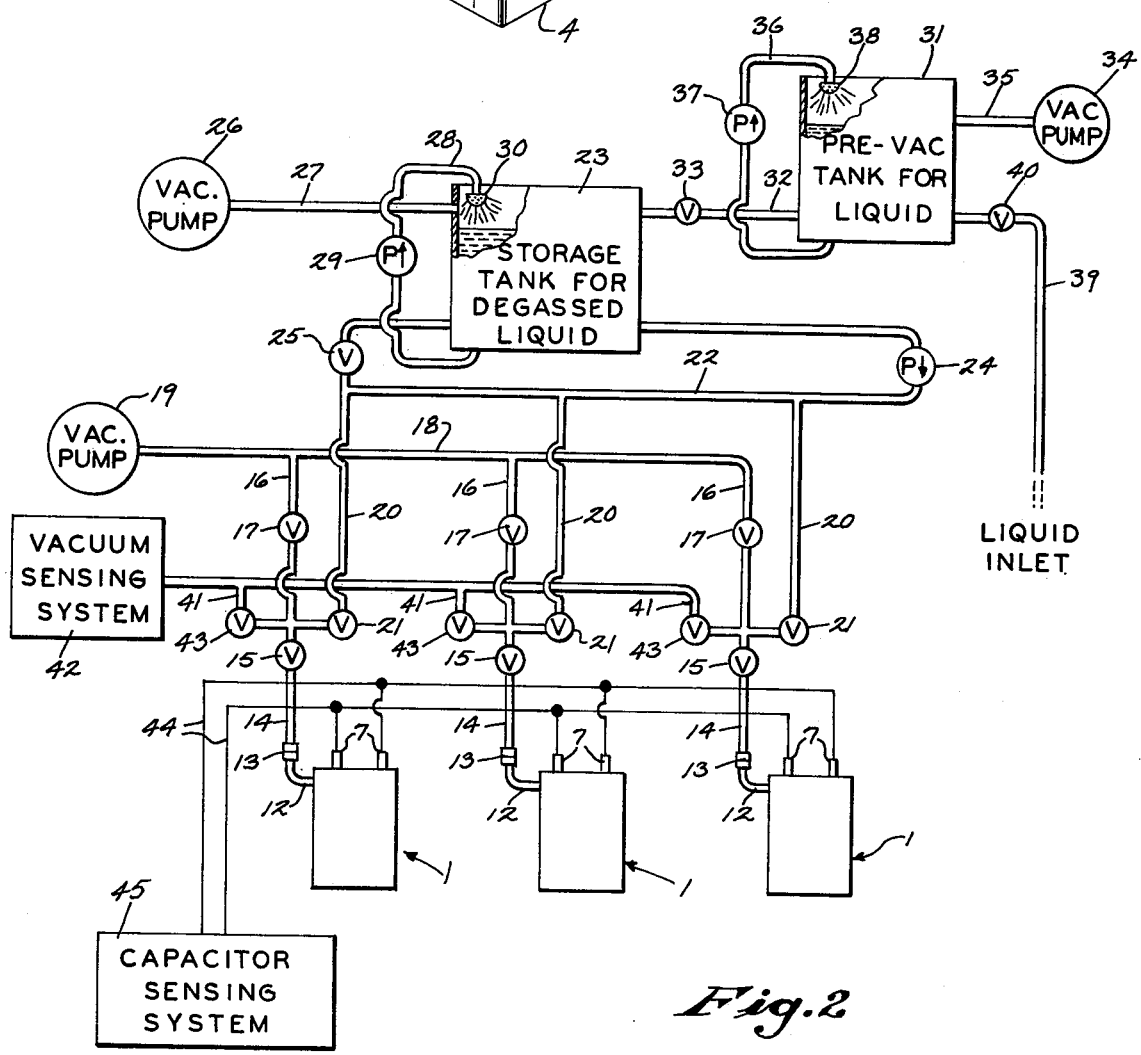

METHOD OF PROCESSING AN ELECTRICAL APPARATUS

This is a continuation of application Ser. No. 612,028, filed Sept, 10, 1975 now abandoned.

BACKGROUND OF THE INVENTION

A typical capacitor is composed of a series of capacitor packs, each of which includes wound layers of metal foil separated by a dielectric layer. Electrodes are connected to the foil layers and the electrodes of the various packs are connected together for final connection to the terminal of the capacitor.

The processing of electrical apparatus, such as a capacitor, is extremely important in providing the desired efficiency and reliability. In processing the capacitor, a dielectric liquid is introduced into the interior of the casing and acts to impregnate the dielectric layers. In the past, the processing has been carried out by initially placing a group of capacitors in an autoclave, and heating the capacitors to a temperature generally in the range of 180° F. to 240° F., while drawing a vacuum on the autoclave to remove air and water vapor from the interior of the capacitor. In some cases, in the past, an individual vacuum line has also been connected to the capacitor casing to increase the efficiency of the evacuating process. After the capacitors have been subjected to the sub-atmospheric pressure and elevated temperature for a period of about four days, the dielectric liquid is admitted into the casing to impregnate the dielectric material of the capacitor. In normal processing the capacitors are permitted to soak under vacuum and at a temperature in the range of 120° F. to 190° F. for a period up to several days to thoroughly impregnate the dielectric layers with the dielectric liquid. After this soaking period, the capacitors are sealed and are ready for other manufacturing processes.

Recently, polymeric film, such as polypropylene or polyethylene, has had increased use as the dielectric material in electrical apparatus. Conventional processing techniques cannot be successfully applied to capacitors having all polymeric film as the dielectric material, because the elevated temperatures cause an expansion of the molecular structure of the polymeric film and the expansion adversely effects the diffusion of the liquid dielectric into the polymeric film.

SUMMARY OF THE INVENTION

The invention relates to an improved, room temperature, processing system for an electrical apparatus, such as a capacitor, containing polymeric film as the dielectric layer. In accordance with the invention, the interior of the capacitor casing is connected to a source of vacuum to remove air and other gases, and when the vacuum within the casing is at a value of less than about 100 microns, as determined by a vacuum sensing unit, fully degassed liquid dielectric is introduced to the casing to impregnate the dielectric material. A positive pressure can be applied to the dielectric liquid to increase the effectiveness of the impregnation, and when the desired capacitance is obtained, the impregnation is complete and the unit is sealed.

The processing of the invention can be carried out at room temperature and eliminates the use of expensive heating equipment, such as ovens and autoclaves, as have been used in the past.

The capacitors, or other electrical apparatus, processed in accordance with the invention, have improved dielectric characteristics and reliability. Through use of the fully degassed liquid dielectric and due to accurate control over the vacuum conditions, improved uniformity in dielectric properties is obtained from part-to-part than that obtained with prior methods.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of a capacitor, with parts broken away, connected to the processing system; and FIG. 2 is a flow sheet showing the processing system of the invention.

DESCRIPTION OF THE PREFERRED EMBODIMENT

FIG. 1 shows a typical capacitor 1, having an outer casing 2 formed of side walls 3, and bottom wall 4, and a cover 5. One of the side walls 3, or alternately the cover 5, is provided with a seal hole 6 which is closed off by a suitable plug after the capacitor has been processed. A pair of terminals 7 project from the cover 5 and are insulated from the cover.

A series of capacitor packs 8 are located within the casing 2 and each capacitor pack if formed of convolutely wound alternate layers of metal foil 9 separated by dielectric layers 10. Electrodes 11 are connected to the metal foil 9, and the electrodes of the various packs are connected together in series for final connection to terminals 7.

The foil layers 9 may be formed of any desired electrically conductive material, generally a metallic material such as aluminium, or the like. The layers 9 may be in the form of flat sheets, or the layers can be provided with surface irregularities, such as a series of deformations formed by indentations on one side of the foil and corresponding elevations on the other side, as disclosed in U.S. Pat. No. 3,746,953.

The solid dielectric layers 10 are composed of polymeric film such as polypropylene, polyethylene, polyester, or polycarbonate. The dielectric layers 10 can take the form of smooth-surfaced strips or can take the form of a polymeric strip, such as polypropylene, having a layer of fine polyolefin fibers adhering to the surface, as disclosed in U.S. Pat. No. 3,772,578. The term "all film" as used in the description, means that the dielectric layers 10 are formed of all polymeric materials, but it is possible that other components of the capacitor could be formed of paper or non-polymeric materials which would also be impregnated with the liquid dielectric composition.

It is important that the surface of the polymeric film 9 and/or contiguous surface of the metal foil 9 have surface irregularities or deformations so that the two contiguous surfaces are not in continuous intimate contact. The surface irregularities provide a wicking or capillary effect for the liquid dielectric, enabling the liquid to thoroughly impregnate the film 10 during processing.

The dielectric liquid can be of any conventional type commonly used in electrical apparatus containing polymeric dielectric materials. For example, the dielectric liquid can be a halogenated diphenyl, such as trichlorodiphenyl; polybutene as disclosed in U.S. Pat. No. 3,996,505; a mixture of mono-halogenated diphenyl oxide and a mono-halogenated alkyl diphenyl oxide where the alkyl group contains from 1 to 20 carbon atoms, as disclosed in pending United States patent application Ser. No. 542,391, filed Jan. 20, 1975; and the like.

A series of capacitors 1 are processed in accordance with the method of the invention at a temperature below 60° C. and preferably at room temperature. A flexible tube 12 is connected to the hole 6 in each casing 2 and, as shown in FIG. 1, tube 12 is connected by a standard quick-release coupling 13 to a line 14 and the flow of fluid through the feed line 14 is controlled by a valve 15. Connected to line 14 is a vacuum line 16 containing valve 17, and each vacuum line 16 is connected to a header 18 which in turn is connected to a standard vacuum pump 19. Operation of the vacuum pump 19 will draw a vacuum within the header 18 and will serve to evacuate the casing 2 when valves 17 and 15 are open.

Each line 14 is also connected to a liquid supply line 20 which contains a valve 21, and each line 20 is connected to a manifold 22 which, in turn, is connected to a liquid storage tank 23 that contains the degassed dielectric liquid.

As shown in FIG. 2, manifold 22 is a closed line having both ends connected to tank 23, and the manifold contains a pump 24 and a control valve 25. The control valve 25 can be of a type that can be set to open at a given pressure and thus controls the pressure of the dielectric liquid being supplied through manifold 22 to the capacitor casings 2 through the supply lines 20.

The dielectric liquid in tank 23 is degassed to remove air and other vapor by a vacuum pump 26 which is connected by line 27 to the headspace of the storage tank. The liquid within the storage tank 23 is agitated by circulating the liquid through a closed line 28 by a pump 29. The circulation acts to agitate the liquid so that it will be more effectively degassed through operation of the vacuum pump 26 which develops a vacuum in the range of 10 to 100 microns in tank 23. To increase the efficiency of the degassing, the liquid can be returned to tank 23 through a spray nozzle 30 which is connected to line 28 and is located above the liquid level in tank 23.

The dielectric liquid is supplied to the storage tank 23 from a tank 31 which is connected to the storage tank by line 32 containing valve 33. The dielectric liquid in the tank 31 is also degassed by a vacuum pump 34 which is connected to the headspace of tank 31 by line 35 and the vacuum pump develops a vacuum in the range of 10 to 100 microns in the tank. As in the case of the storage tank 23, the liquid within the tank 31 is agitated by circulating the liquid through a closed line 36 by pump 37, and a spray nozzle 38 can be connected to line 36 to spray the returning liquid in the headspace of the tank 31.

The dielectric liquid is supplied to the tank 31 through a line 39 and the flow of the liquid in line 39 is controlled by valve 40.

With this system, the dielectric liquid is subjected to a preliminary degassing operation in tank 31 and is subsequently subjected to a second or final degassing treatment in tank 23. This two-stage degassing insures that the dielectric liquid will be substantially free of entrapped air and other gases.

A line 41 is also connected to each line 14, and each line 41 communicates with a standard vacuum sensing unit 42 which provides an indication of the pressure within the line 14 and casing 2. Valve 43 is connected in each line 41. The vacuum sensing unit 42 is a standard type of unit in which the sub-atmospheric pressure or vacuum can be visually discerned on a dial or other indicator. Alternately, the lines 41 can be closed off and pressure probes can be located adjacent the closed ends of the lines. In this case, the probes would be connected by electrical leads to a vacuum indicating mechanism which provides a reading of the vacuum or sub-atmospheric pressure.

To measure the capacitance of the capacitor during the processing, electrical leads 44 are connected between the terminals 7 and a standard capacitance sensing unit 45 provides a visual measurement of the capacitance of the capacitor.

In carrying out the processing, a series of capacitors 1 are placed on a table or other supporting surface and tube 12 is connected to the fill hole 6 in each capacitor casing. Each tube 12 is connected through coupling 13 to the respective line 14. The valves 15 and 17 are then opened in each line 12 to draw a vacuum on the interior of each casing and the vacuum sensing unit 42 provides an indication of the magnitude of the vacuum in each casing. it is preferred to reduce the pressure in each casing to a vacuum of 100 microns or less, which will normally take a period of about 2 or 3 days and during this evacuation the temperature of the casing is maintained below 60° C., and preferably at room temperature, to prevent molecular expansion of the polymeric dielectric layers.

During the period the casings are being evacuated, the dielectric liquid is admitted to the tank 31 and circulated through line 35 by pump 37 while vacuum is being drawn through line 35, to thereby remove gas from the dielectric liquid. Subsequently, the liquid is transferred to the storage tank 23 by opening valve 33 in line 32 and further degassing is carried on by circulating the dielectric liquid through the line 28 by pump 29 while drawing a vacuum through line 27 by operation of the pump 26.

When the desired vacuum conditions have been achieved within the group of capacitor casings, as indicated by the reading on the vacuum sensing unit 42, valves 17 and 43 are closed and pump 24 is operated to circulate the degassed dielectric liquid through the manifold 22. The pressure on the liquid within the manifold 22 is controlled by the control valve 25.

The valves 21 in the lines 20 are then opened to admit the dielectric liquid to the interior of the casings and the pressure of the liquid in manifold 22 provides a positive or super-atmospheric pressure on the liquid in each casing, generally in the amount of 1 to 5 psig, to thoroughly impregnate the dielectric layers with the liquid. Periodically, the capacitance of each capacitor is read through the capacitance sensing units 45 and when the capacitance of each capacitor has reached the predetermined required value, valves 21 are closed, the tubes 12 are disconnected from the casings and the fill holes 6 are sealed, to complete the processing.

While proper impregnation of the dielectric layer can be determined by taking capacitance readings, the impregnation can also be controlled through use of an established time period. Through experience, it can be determined that the required capacitance can be obtained for a given size capacitor within a given time period. Thus, by setting the impregnation for a given period of time, the required capacitance can be achieved.

The processing system of the invention provides improved dielectric characteristics and reliability for capacitors and other electrical apparatus utilizing an all-polymeric dielectric material. As the processing is preferably carried out at room temperature, the use of expensive heating equipment, such as ovens or autoclaves, is eliminated. As the conditions of the processing are accurately controlled, greater uniformity in dielectrical characteristics are achieved from part-to-part.

Various modes of carrying out the invention are contemplated as being within the scope of the following claims particularly pointing out and distinctly claiming the subject matter which is regarded as the invention.

We claim:

1. A method of processing an electrical capacitor having an outer casing containing a polymeric dielectric material and electrically conductive layers, comprising the steps of degassing a dielectric liquid to remove gas therefrom by subjecting the liquid to a sub-atmospheric pressure, subjecting the interior of the casing to sub-atmospheric pressure to evacuate the same, introducing the degassed dielectric liquid into the casing while maintaining a sub-atmospheric pressure on the interior of the casing and on said liquid, applying a super-atmospheric pressure to the degassed liquid disposed within the casing to impregnate the dielectric material, maintaining the dielectric material at a temperature below 60° C. during the steps of evacuating the casing and impregnating the dielectric material, and thereafter sealing the casing while maintaining the super-atmospheric pressure on the liquid.

2. The method of claim 1, and including the step of measuring the dielectric properties of the apparatus at intervals after the liquid is introduced into the casing, and terminating the impregnation when said dielectric properties reach a predetermined value.

3. A method of processing an electrical capacitor having an outer casing containing a polymeric dielectric material and electrically conductive layers, comprising the steps of degassing a dielectric liquid by agitating the liquid while subjecting the liquid to a sub-atmospheric pressure less than 100 microns, subjecting the interior of the casing to a sub-atmospheric pressure less than 100 microns to evacuate the same, introducing the degassed dielectric liquid into the evacuated casing while maintaining a sub-atmospheric pressure on said liquid at a value less than 100 microns, applying a super-atmospheric pressure in the range of 1 to 5 psig to the liquid in the casing to impregnate the dielectric material with said liquid, maintaining the dielectric material at a temperature below 60° C. during the steps of evacuating the casing and impregnating the dielectric material, measuring the dielectric properties of the apparatus at intervals after the liquid is introduced into the casing, and sealing the casing when said dielectric properties reach a predetermined value.

* * * * *